(12) United States Patent
Hoshi et al.

(10) Patent No.: US 10,597,543 B2
(45) Date of Patent: Mar. 24, 2020

(54) METHOD FOR REPAIRING OR REINFORCING STRUCTURE, METHOD FOR PRODUCING REPAIRED OR REINFORCED STRUCTURE, AND ADHESIVE SHEET

(71) Applicant: DAI NIPPON PRINTING CO., LTD., Tokyo-to (JP)

(72) Inventors: Kentaro Hoshi, Tokyo-to (JP); Takahisa Taniguchi, Tokyo-to (JP); Tomoyuki Tachikawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 425 days.

(21) Appl. No.: 15/304,194

(22) PCT Filed: Apr. 3, 2015

(86) PCT No.: PCT/JP2015/060577
§ 371 (c)(1),
(2) Date: Nov. 25, 2016

(87) PCT Pub. No.: WO2015/159733
PCT Pub. Date: Oct. 22, 2015

(65) Prior Publication Data
US 2017/0120547 A1    May 4, 2017

(30) Foreign Application Priority Data
Apr. 15, 2014   (JP) .................... 2014-083909

(51) Int. Cl.
*B29C 73/10*       (2006.01)
*C09D 7/40*        (2018.01)
(Continued)

(52) U.S. Cl.
CPC ............ *C09D 7/40* (2018.01); *B29C 35/0805* (2013.01); *B29C 35/0866* (2013.01);
(Continued)

(58) Field of Classification Search
CPC ........................... E04G 23/0214; B29C 73/10
See application file for complete search history.

(56) References Cited

U.S. PATENT DOCUMENTS

| 4,133,913 A * | 1/1979 | Moore | B05D 5/005 |
| | | | 156/94 |
| 5,732,743 A * | 3/1998 | Livesay | B29C 65/4845 |
| | | | 138/99 |

(Continued)

FOREIGN PATENT DOCUMENTS

| JP | H08-218646 A | 8/1996 |
| JP | 2004-027718 A | 1/2004 |

(Continued)

OTHER PUBLICATIONS

Mar. 2, 2018 Office Action issued in Japanese Patent Application No. 2016-513717.

(Continued)

*Primary Examiner* — Scott W Dodds
(74) *Attorney, Agent, or Firm* — Oliff PLC

(57) ABSTRACT

There is provided a method for repairing or reinforcing a structure. The method includes the steps of: providing an adhesive sheet comprising an adhesive layer comprising at least a curable resin composition whose curing is promoted by irradiation with ionizing radiation and a curing aid which generates a basic substance by irradiation with ionizing radiation; attaching the adhesive sheet to a surface of the structure; and curing the adhesive layer of the adhesive sheet in a state where the adhesive layer is exposed.

14 Claims, 3 Drawing Sheets

(51) Int. Cl.

| | | |
|---|---|---|
| *C09D 163/00* | (2006.01) | |
| *C09J 5/02* | (2006.01) | |
| *C09J 7/00* | (2018.01) | |
| *E04G 23/02* | (2006.01) | |
| *C09J 201/00* | (2006.01) | |
| *C09J 11/06* | (2006.01) | |
| *C09J 5/00* | (2006.01) | |
| *B29C 35/08* | (2006.01) | |
| *C09D 5/00* | (2006.01) | |
| *B29K 63/00* | (2006.01) | |
| *B29K 105/00* | (2006.01) | |
| *B29K 105/08* | (2006.01) | |
| *B29L 31/00* | (2006.01) | |
| *C09J 163/00* | (2006.01) | |

(52) U.S. Cl.
CPC .............. *B29C 73/10* (2013.01); *C09D 5/002* (2013.01); *C09D 163/00* (2013.01); *C09J 5/00* (2013.01); *C09J 5/02* (2013.01); *C09J 7/00* (2013.01); *C09J 11/06* (2013.01); *C09J 201/00* (2013.01); *E04G 23/02* (2013.01); *B29C 2035/0833* (2013.01); *B29C 2035/0872* (2013.01); *B29K 2063/00* (2013.01); *B29K 2105/0097* (2013.01); *B29K 2105/0809* (2013.01); *B29L 2031/776* (2013.01); *C09J 163/00* (2013.01); *C09J 2205/31* (2013.01); *C09J 2453/00* (2013.01); *C09J 2463/00* (2013.01); *C09J 2463/008* (2013.01)

(56) References Cited

U.S. PATENT DOCUMENTS

| | | | | |
|---|---|---|---|---|
| 2008/0261039 | A1* | 10/2008 | Tanaka | H01L 21/67132 |
| | | | | 428/352 |
| 2011/0086311 | A1* | 4/2011 | Katayama | C08G 73/10 |
| | | | | 430/280.1 |
| 2013/0012086 | A1* | 1/2013 | Jones | B29C 73/10 |
| | | | | 442/66 |
| 2013/0337161 | A1* | 12/2013 | Akimoto | C09C 3/006 |
| | | | | 427/162 |

FOREIGN PATENT DOCUMENTS

| | | |
|---|---|---|
| JP | 2004-137797 A | 5/2004 |
| JP | 2006-102738 A | 4/2006 |
| JP | 2009-052396 A | 3/2009 |
| JP | 2010-144360 A | 7/2010 |
| JP | 2011-117129 A | 6/2011 |
| JP | 2013-087149 A | 5/2013 |
| WO | 2010/113813 A1 | 10/2010 |
| WO | 2014/007341 A1 | 1/2014 |

OTHER PUBLICATIONS

Oct. 13, 2017 Office Action issued in Japanese Patent Application No. 2016-513717.
Nov. 16, 2017 Search Report issued in European Patent Application No. 15779569.1.
May 12, 2015 International Search Report issued in International Patent Application No. PCT/JP2015/060577.
Oct. 18, 2016 International Preliminary Report on Patentability issued in International Patent Application No. PCT/JP2015/060577.

* cited by examiner

METHOD FOR REPAIRING OR REINFORCING STRUCTURE, METHOD FOR PRODUCING REPAIRED OR REINFORCED STRUCTURE, AND ADHESIVE SHEET

BACKGROUND

Technical Field

The present disclosure relates to a method for repairing or reinforcing a structure using an adhesive sheet, a method for producing a repaired or reinforced structure using the adhesive sheet, and the adhesive sheet used for the method.

Background Art

Social infrastructures such as roads, flood control facilities, sewers, harbors, public housings, parks, coasts, airports, beacons, and government facilities deteriorate with time. Since it is impossible to replace all of them at once, they are replaced in order while being repaired and reinforced for maintenance of the status quo.

The repair and reinforcement of social infrastructures (hereinafter also referred to as repair/reinforcement) are urgent issues at present especially from the viewpoint of safety, and a number of aged social infrastructures such as public facilities need to be repaired or reinforced. However, in spite of the fact that such an urgent necessity of repair/reinforcement is recognized, there are many problems. For example, there are the following problems: 1) the number of aged social infrastructures requiring repair/reinforcement is very large, as can be seen from, for example, the fact that there are not less than 10,000 tunnels; 2) efficient operations have not yet been realized since there are many operations requiring labor and time, such as repair/reinforcement techniques and testing techniques including visual inspection and hammering tests, and the know-how of such operations has not yet been established because of delay of their standardization; and 3) maintenance of social infrastructures requires a huge cost including the labor cost.

Among the methods for repair/reinforcement of social infrastructures, there have been several proposals on methods of repair/reinforcement of concrete in tunnels. For example, repair or reinforcement of the concrete is usually carried out by application of an adhesive, paint, or the like several times to the portion requiring the repair/reinforcement, or by adhesion of a repair/reinforcement sheet to the portion. In particular, repair/reinforcement sheets are preferably used for preventing infiltration of concrete-deteriorating factors such as water, oxygen, carbon dioxide, and chloride ions into concrete, and for reinforcing deteriorated concrete having decreased strength. A variety of such techniques related to repair, or reinforcement of concrete have been conventionally proposed.

In terms of the above-described repair/reinforcement sheet, JP 2010-144360 A (Patent Document 1) proposes a technique for a concrete repair method in which a concrete repair sheet comprising: an intermediate layer having a resin film; and surface layers composed of a fabric material, laminated on both sides of the intermediate layer through an adhesive resin; is attached using a construction adhesive to the concrete surface to be repaired, and a paint is then applied to the surface layer opposite to the concrete-facing surface of the attached concrete repair sheet. According to this technique, the surface layer in contact with the concrete surface is composed of a fabric material having a large surface area. It is therefore said that, even in cases where the concrete surface is a vertical surface or a ceiling surface, falling or detachment of the concrete repair sheet before the complete cure of the construction adhesive hardly occurs, and that a high construction quality can be achieved. It is also said that, since the construction adhesive is completely isolated from the paint by the concrete repair sheet, application of the paint can be carried out without waiting for curing of the construction adhesive, so that the work time can be reduced. However, the technique described above has a problem in the operability since the construction adhesive is applied to the concrete or the concrete repair sheet during the concrete repair operation. There is also a problem that reproducibility of the repair operation is low since that amount of the construction adhesive applied cannot be constant.

JP 2004-27718 A (Patent Document 2) proposes a technique for a repair/reinforcement/deterioration prevention sheet for concrete structures, wherein a protection layer is adhered to an adhesive application layer, and an adhesive layer which is an adhesive or a hot-melt adhesive is formed on the surface of the adhesive application layer to be adhered to the concrete structure. According to this technique, it is said that, by attaching this repair/reinforcement/deterioration prevention sheet to the portion requiring repair on site, operations of repair and reinforcement for preventing falling of the concrete can be reduced or shortened, and stabilization of the quality can be achieved. However, since, in the above technique, the adhesive layer is an adhesive or a hot-melt adhesive, the adhesiveness is insufficient in cases where, for example, the adhesive layer is an, which is problematic. In cases where the adhesive layer is a hot-melt adhesive, the adhesive is softened by the heat during the adhesion. Thus, when the concrete surface is a vertical surface or a ceiling surface, adhesion of the sheet to the concrete surface is difficult, which is problematic.

Taking such problems in the operability into account, JP 2009-052396 A (Patent Document 3) proposes, as a method for repairing a concrete structure using a photo-curing fiber-reinforced resin (also referred to as FRP) sheet, a method in which a photo-curing FRP sheet is placed on the surface of concrete to be repaired, and the photo-curing FRP sheet is then cured using a UV illuminator or the like in a state where the sheet is in close contact with the concrete surface.

WO 2014/007341 (Patent Document 4) proposes a method in which an adhesive sheet, which has adhesiveness and can be cured by light or heat is temporarily fixed (attached) to the concrete surface, and a repair/reinforcement sheet having a fiber-reinforced layer is attached onto the adhesive sheet, followed by curing the adhesive sheet. It is said that this method allows reduction of the workload during the repair/reinforcement operation.

RELATED ART DOCUMENTS

Patent Documents

Patent Document 1: JP 2010-144360 A
Patent Document 2: JP 2004-27718 A
Patent Document 3: JP 2009-052396 A
Patent Document 4: WO 2014/007341

SUMMARY

Since the method for repairing concrete described in Patent Document 3 enables instant repair/reinforcement of concrete, the method is effective in cases where the portion to be repaired is already specified. However, since the photo-curing FRP sheet does not have initial adhesiveness, attachment and curing of the sheet need to be carried out repeatedly, so that the method is not suitable for cases where repair/reinforcement needs to be carried out for a large area such as an entire concrete structure.

In the method proposed by Patent Document 4, repair/reinforcement of concrete is carried out by attaching a fiber-reinforced sheet to an adhesive sheet. Since the fiber-reinforced sheet is in a state where it is attached to the surface of the adhesive sheet during curing of the adhesive sheet, the adhesive sheet does not directly contact the air. However, in cases where the curing is carried out under conditions where the adhesive sheet is exposed to the air, the curing may be inhibited by oxygen in the air depending on the type of the curing agent or the curing catalyst used for the adhesive sheet, leading to failure of curing of the adhesive sheet. The inhibition of curing can be suppressed by providing a release sheet or the like on the surface of the adhesive layer to prevent direct contact of the adhesive layer with the air during its curing. However, in such a case, the release sheet needs to be released after the curing of the adhesive layer, so that the operation time for completion of the work increases when the curing takes a long time, which is problematic.

In some cases, before the repair/reinforcement sheet is attached to the concrete surface, the concrete surface is washed to remove foreign substances and the like, and application of a contact aid to the concrete surface, which is also called the primer treatment, is carried out for improving the contact of the repair/reinforcement sheet. For example, a contact aid containing an epoxy-amine-based polymer as a major component is used for the primer treatment. However, depending on the type of the curing agent or the curing catalyst used for the adhesive sheet, the contact aid is deteriorated in some cases.

Thus, an object of the present invention is to provide a method for repairing or reinforcing a structure, wherein, even in cases where the adhesive sheet is cured using an ionizing radiation such as sunlight, the workload can be low, and the contact of the structure with the adhesive sheet can be firmly maintained.

As a result of intensive study to solve the problems described above, the present inventors discovered that, when a structure is repaired or reinforced using an adhesive sheet comprising a curable resin composition whose curing is promoted by irradiation with ionizing radiation, inhibition of the curing due to oxygen in the air can be suppressed by use of a curing aid that generates a basic substance by irradiation of ionizing radiation.

The present inventors then discovered that, since, by using an adhesive sheet comprising such a curing aid, the adhesive layer can be cured in a state where the adhesive layer is exposed to the air, the labor of removing a release sheet after the curing can be omitted even in cases where the curing takes several days, that is, for example, even in cases where the adhesive layer is cured by sunlight.

The present inventors also discovered that, even in cases where a contact aid comprising an epoxy-amine-based polymer as a major component is used for the primer treatment, deterioration of the contact aid can be prevented by use of an adhesive sheet comprising the curing aid described above, so that contact between the structure and the adhesive sheet can be firmly maintained. The present invention was made based on such discoveries.

The method for repairing or reinforcing a structure according to the first embodiment of the present invention is a method for repairing or reinforcing a structure by using an adhesive sheet comprising an adhesive layer, the method comprising the steps of:

providing an adhesive sheet comprising an adhesive layer comprising at least a curable resin composition whose curing is promoted by irradiation with ionizing radiation and a curing aid which generates a basic substance by irradiation with ionizing radiation;

attaching the adhesive sheet to a surface of the structure; and curing the adhesive layer of the adhesive sheet in a state where the adhesive layer is exposed.

The method for repairing or reinforcing a structure according to the second embodiment of the present invention is the method for repairing or reinforcing a structure according to the first embodiment of the present invention, wherein the adhesive sheet before being attached to the surface of the structure has a release sheet provided on at least one side of the adhesive layer; the method comprises the step of releasing the release sheet from the adhesive sheet after attaching the adhesive sheet to the surface of the structure; and the adhesive layer of the adhesive sheet is cured after releasing the release sheet from the adhesive sheet.

The first and second embodiments of the present invention may further comprise a fifth step of subjecting the surface of the structure to primer treatment before attaching the adhesive sheet to the surface of the structure, wherein the primer treatment may be carried out by applying a primer comprising an epoxy resin and a polyamine-based curing agent to the surface of the structure.

The method for repairing or reinforcing a structure according to the third embodiment of the present invention is a method for repairing or reinforcing a structure by using an adhesive sheet comprising an adhesive layer, the method comprising the steps of:

applying a primer comprising an epoxy resin and a polyamine-based curing agent to a surface of the structure, to perform primer treatment; attaching the adhesive layer of the adhesive sheet to the surface of the structure subjected to the primer treatment, the adhesive layer comprising at least a curable resin composition whose curing is promoted by irradiation with ionizing radiation and a curing aid which generates a basic substance by irradiation with ionizing radiation; and curing the adhesive layer.

An embodiment of the present invention may comprise the step of further attaching a repair member or a reinforcing member onto the adhesive layer before the curing of the adhesive layer. In an embodiment of the present invention, the adhesive layer may comprise a repair member or a reinforcing member comprising a fiber material.

In an embodiment of the present invention, the curable resin composition may comprise a curable compound having at least two epoxy groups in the molecule.

In an embodiment of the present invention, the curing time of the e adhesive layer is may be least one day.

In an embodiment of the present invention, the curing of the adhesive layer may be carried out by irradiation with sunlight.

An embodiment of the present invention also provides an adhesive sheet in a method for repairing or reinforcing a structure.

An embodiment of the present invention also provides a method for producing a structure repaired or reinforced by using an adhesive sheet comprising an adhesive layer.

One method thereof comprises the steps of:

providing an adhesive sheet comprising an adhesive layer comprising at least a curable resin composition whose curing is promoted by irradiation with ionizing radiation and a curing aid which generates a basic substance by irradiation with ionizing radiation;

attaching the adhesive sheet to a surface of the structure; and curing the adhesive layer of the adhesive sheet in a state where the adhesive layer is exposed.

Another method thereof comprises the steps of:

applying a primer comprising an epoxy resin and a polyamine-based curing agent to a surface of the structure, to perform primer treatment;

attaching the adhesive layer of the adhesive sheet to the surface of the structure subjected to the primer treatment, the adhesive layer comprising at least a curable resin composition whose curing is promoted by irradiation with ionizing radiation and a curing aid which generates a basic substance by irradiation with ionizing radiation; and curing the adhesive layer.

DETAILED DESCRIPTION

Figure 1:
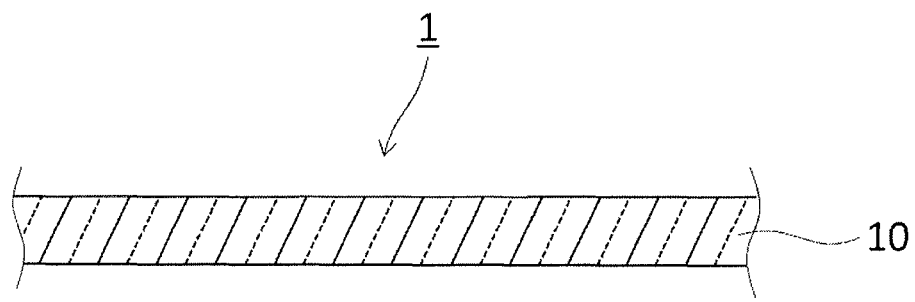
FIG. 1 is a schematic cross-sectional view of an embodiment of the adhesive sheet used in the method for repairing or reinforcing a structure according to an embodiment of the present invention.

First and Second Embodiments of Present Invention

The methods for repairing or reinforcing a structure according to the first and second embodiments of the present invention are described below with reference to drawings when necessary. The method for repairing or reinforcing a structure according to the first embodiment of the present invention comprises the steps of: 1) providing an adhesive sheet comprising an adhesive layer comprising at least a curable resin composition whose curing is promoted by irradiation with ionizing radiation and a curing aid which generates a basic substance by irradiation with ionizing radiation; 2) attaching the adhesive sheet to a surface of the structure; and 3) curing the adhesive layer of the adhesive sheet in a state where the adhesive layer is exposed. The adhesive sheet used in the method for repairing or reinforcing a structure according to the second embodiment of the present invention has an adhesive layer, and a release sheet provided on at least one side of the adhesive layer. The second embodiment of the present invention comprises the step of releasing the release sheet from the adhesive sheet after the attachment of the adhesive sheet to the surface of the structure. Each step is described below.

[Step of Providing Adhesive Sheet]

The adhesive sheet used in the method for repairing or reinforcing a structure according to the first embodiment of the present invention has an adhesive layer that can be cured by irradiation with ionizing radiation such as sunlight, and the adhesive layer comprises at least a curable resin composition whose curing is promoted by irradiation with ionizing radiation and a curing aid which generates a basic substance by irradiation with ionizing radiation. In the present description, "ionizing radiation" means not only electromagnetic waves having visible and invisible wavelengths, but also particle beams such as electron beams, as well as radiation as a general term for electromagnetic waves and particle beams. More specifically, examples of the "ionizing radiation" include microwaves, infrared rays, visible rays, ultraviolet rays, X-rays, and v-rays.

Examples of the curable resin composition whose curing is promoted by irradiation with ionizing radiation include conventionally known ionizing radiation curable resins. In the present invention, curable compounds having at least two epoxy groups in the molecule may be preferably used. Examples of such compounds include ionizing radiation curable epoxy resins. As these ionizing radiation curable epoxy resins, various ionizing radiation curable epoxy resins may be used without limitation. Preferably, while the ionizing radiation curable epoxy resin may be curable in a state where it is exposed to natural light such as sunlight, the resin is not cured even by exposure to natural light during the process of attaching the adhesive sheet to the structure as described later. Thus, in the present invention, the curable resin composition is preferably one comprising a liquid ionizing radiation curable epoxy resin.

The liquid epoxy resin is not limited as long as it is an epoxy resin which is in a liquid state at normal temperature, and various epoxy resins may be used. Examples of the liquid epoxy resin include one or more selected from, for example, bisphenol A type epoxy resins, bisphenol F type epoxy resins, biphenyl type epoxy resins, hydrogenated bisphenol A type epoxy resins, aliphatic epoxy resins, stilbene type epoxy resins, orthocresol novolak type epoxy resins, phenol novolak type epoxy resins, modified phenol type epoxy resins, triphenol methane type epoxy resins, alkyl-modified triphenol methane type epoxy resins, triazine nucleus-containing epoxy resins, naphthalene type epoxy resins, dicyclopentadiene type epoxy resins, dicyclopentadiene-modified phenol type epoxy resins, and glycidylamine type epoxy resins. The liquid epoxy resin acts such that the adhesive layer is given a practical adhesive force and a high adhesive force. Thus, even in cases where the portion of the structure to be repaired or reinforced is a vertical surface or a ceiling surface, the adhesive sheet can be attached and temporarily fixed to the structure, so that the operation can be easily carried out. Moreover, since the adhesive layer can be allowed to cure slowly, there is no need to cure the adhesive sheet in a short time using a UV illuminator or the like.

Among the liquid epoxy resins described above, bisphenol type epoxy resins such as bisphenol A type epoxy resins and bisphenol F type epoxy resins may be preferably used since they can improve the mechanical strength, curing performance, heat resistance, adhesiveness, and the like. Bisphenol A type epoxy resins may be especially preferably used. Bisphenol A type epoxy resins having one to three bisphenol skeletons as the backbone are preferably used since they are in a liquid state at normal temperature.

The liquid epoxy resin preferably has a mass average molecular weight (Mw) of not less than 300 and not more than 2000. Since liquid epoxy resins having a mass average molecular weight within this range have good compatibility with acrylic resins, they can be favorably used. The epoxy equivalent (g/eq.) of the liquid epoxy resin is preferably not less than 100 and less than 800. Since liquid epoxy resins having an epoxy equivalent within this range can give high durability to the adhesive layer after curing. The epoxy equivalent is the number of grams of a resin containing 1 gram equivalent of epoxy groups as measured by a method according to JIS K7236.

For giving a high adhesive force and a high cohesive force, a solid epoxy resin may be included in addition to the liquid epoxy resin described above. The solid epoxy resin is not limited as long as it is an epoxy resin which is in a solid state at normal temperature. Various epoxy resins may be used. Examples of the solid epoxy resin include one or more selected from, for example, bisphenol A type epoxy resins, bisphenol F type epoxy resins, orthocresol novolak type epoxy resins, phenol novolak type epoxy resins, modified phenol type epoxy resins, naphthalene type epoxy resins, triphenol methane type epoxy resins, alkyl-modified triphenol methane type epoxy resins, triazine nucleus-containing epoxy resins, dicyclopentadiene type epoxy resins, glycidylamine type epoxy resins, biphenyl type epoxy resins, biphenylaralkyl type epoxy resins, hydrogenated bisphenol A type epoxy resins, aliphatic epoxy resins, stilbene type epoxy resins, and bisphenol A novolak type epoxy resins.

Among these, bisphenol type epoxy resins such as bisphenol A type epoxy resins and bisphenol F type epoxy resins may be preferably used from the viewpoint of mechanical strength, curing performance, heat resistance, adhesiveness, and the like. Bisphenol A type epoxy resins may be especially preferably used. Bisphenol A type epoxy resins having 2 to 10 bisphenol skeletons as the backbone are usually in a solid state at normal temperature.

The solid epoxy resin preferably has a mass average molecular weight (Mw) of not less than 300 and not more than 8000. Since solid epoxy resins having a mass average molecular weight within this range have good compatibility with acrylic resins, they can be favorably used. More preferred range of the mass average molecular weight is not less than 800 and not more than 6000. Within this range, a high adhesive force and a high durability can be given to the adhesive layer 2. The epoxy equivalent (g/eq.) of the solid epoxy resin is preferably not less than 100 and not more than 5200.

The amount of the epoxy resin is preferably not less than 20% by mass and not more than 90% by mass, more preferably not less than 25% by mass and not more than 85% by mass, with respect to the total amount of the resin composition and the curing aid constituting the adhesive layer. In cases where the amount of the epoxy resin is within this range, the adhesive layer can be given a adhesive force suitable for its practical use, and a high adhesive force. In cases where the content of the epoxy resin is too small, the cohesive force of the adhesive layer is low, and the contact between the structure and the adhesive layer may decrease after curing of the adhesive layer. On the other hand, in cases where the content of the epoxy resin is too large, optimization of the adhesiveness upon the attachment to the structure is difficult, so that, in some cases, the layer may fail to follow irregularity of the surface of the structure, or lifting or detachment may occur after the attachment to the structure.

The curable resin composition constituting the adhesive layer may comprise a component other than the epoxy resin described above. In consideration of the film-forming performance for formation of the adhesive layer, the curable resin composition may comprise an acrylic resin. In cases where the curable resin composition comprises an acrylic resin, the concentration of the epoxy resin in the curable resin composition relatively decreases. As a result, the acrylic resin acts such that the curing reaction of the epoxy resin proceeds more slowly. Thus, the pot life and the shelf stability of the adhesive sheet can be improved, and curing of the adhesive layer due to exposure to natural light such as sunlight can be prevented during the step of attaching the adhesive sheet to the structure.

As the acrylic resin, components used for conventionally known acrylic adhesives may be used without limitation. Examples of the acrylic resin include, for example, acrylate polymers such as methyl acrylate, ethyl acrylate, propyl acrylate, isopropyl acrylate, isobutyl acrylate, n-hexyl acrylate, octyl acrylate, 2-ethylhexyl acrylate, and lauryl acrylate; and copolymers produced by adding, to these acrylic monomers, functional group-containing monomers such as maleic acid, itaconic acid, 2-hydroxyethyl acrylate, 2-hydroxypropyl acrylate, acrylamide, N-methylolacrylamide, n-butoxy-N-methylolacrylamide, sodium 2-acrylamide-2-methyl-1-propanesulfonate, diacetone acrylamide, or glycidyl acrylate, or monomers such as styrene, vinyl toluene, vinyl acetate, acrylonitrile, vinyl chloride, vinylidene chloride, or ethyl vinyl ether.

Among the copolymer components described above, acrylate copolymers containing, as a monomer component, a compound having a polar group such as an epoxy group, amino group, hydroxyl group, carboxyl group, or nitrile group as a functional group are preferred. These acrylate copolymers can further improve the adhesive force to structures such as concrete. Specific examples of the acrylate copolymers include copolymers of ethyl acrylate-butyl acrylate-acrylonitrile, copolymers of ethyl acrylate-acrylonitrile, and copolymers of butyl acrylate-acrylonitrile. In the present description, "acrylates" such as methyl acrylate and ethyl acrylate include "methacrylates" such as methyl methacrylate and ethyl methacrylate.

Preferred examples of the acrylate copolymers include block copolymers. Among these, block copolymers of methacrylate-acrylate-methacrylate are especially preferred. Block copolymers are preferably used from the viewpoint of giving practical adhesive force to concrete, and improving heat resistance of the adhesive layer 2. Examples of the methacrylate constituting the triblock copolymer include methyl methacrylate, ethyl methacrylate, propyl methacrylate, butyl methacrylate, lauryl methacrylate, 2-ethylhexyl methacrylate, cyclohexyl methacrylate, and benzyl methacrylate. Examples of the acrylate constituting the triblock copolymer include methyl acrylate, ethyl acrylate, propyl acrylate, butyl acrylate, lauryl acrylate, 2-ethylhexyl acrylate, cyclohexyl acrylate, and benzyl acrylate. Specific examples of the block copolymers of methacrylate-acrylate-methacrylate include block copolymers of methyl methacrylate-butyl acrylate-methyl methacrylate.

The mass average molecular weight (Mw) of the acrylic resin is preferably within the range of not less than 10,000 and not more than 1,500,000, more preferably within the range of not less than 50,000 and not more than 1,200,000. In cases where an acrylic resin having a mass average molecular weight within this range is used, the initial adhesive force of the adhesive layer can be easily controlled, and the cohesive force of the adhesive layer can be increased. The mass average molecular weight is a value calculated in terms of polystyrene as measured by gel permeation chromatography (GPC).

The content of the acrylic resin is preferably not less than 4% by mass and not more than 50% by mass with respect to the total amount of the acrylic resin, liquid epoxy resin, and solid epoxy resin. In cases where the content is within this range, the adhesive layer can be given a adhesive force suitable for its practical use, and a high adhesive force. Dependent on the content of the liquid epoxy resin, the adhesive force of the adhesive layer may be low in cases where the content of the acrylic resin is less than 4% by mass. In addition, the film-forming performance for formation of the adhesive layer may be low. On the other hand, in cases where the content of the acrylic resin exceeds 50% by mass, the adhesive force of the adhesive layer after curing may be low. The content of the acrylic resin in the curable resin composition constituting the adhesive layer is preferably not less than 5% by mass and not more than 34% by mass.

In cases where the adhesive layer comprises a curable resin composition whose curing is promoted by irradiation with ionizing radiation, the adhesive sheet can have an adhesive layer with an adhesive force of not less than 0.02 N and not more than 50 N.

The curable resin composition constituting the adhesive layer comprises a compound which generates a basic substance by irradiation with ionizing radiation, as a curing aid for curing of the ionizing-radiation-curable resin such as the epoxy resin described above. The curing reaction of the ionizing-radiation-curable resin proceeds by the action of a chemical species that releases a polymerization initiator by irradiation with ionizing radiation. Examples of such a chemical species include those which generate photoradicals, those which generate acidic substances, and those which generate basic substances, by irradiation with ionizing radiation. In cases where, among these, a chemical species that generates photoradicals is used as the curing aid, when the adhesive sheet is cured under conditions where the sheet is exposed to the air, photoradicals generated by irradiation with ionizing radiation such as sunlight are captured by oxygen in the air, resulting in inhibition of the curing reaction of the ionizing-radiation-curable resin. Thus, it is necessary to provide a release sheet or the like on the surface of the adhesive layer, to prevent direct contact of the adhesive layer with the air during its curing. In some cases, primer treatment is carried out for improving the contact between the structure and the adhesive sheet. In cases where an epoxy-amine-based polymer or the like is used as the contact aid used for the primer treatment, and a chemical species that generates an acidic substance by irradiation with ionizing radiation is used as the curing aid, the acidic substance may cause deterioration of the contact aid, resulting inhibition of the contact between the structure and the adhesive sheet. Moreover, since such a chemical species that generates an acidic substance causes corrosion of metals, repair/reinforcement of portions containing a metal in the structure is impossible in such cases.

Since, in the present invention, a chemical species which generates a basic substance by irradiation with ionizing radiation is used as the curing aid, the ionizing-radiation-curable resin can be cured without being affected by the air. Therefore, there is no need to provide a release sheet or the like for prevention of exposure of the adhesive layer to the air, and the workload can be reduced even in cases where the curing of the adhesive layer takes a long time, such as cases where the curing is achieved by ionizing radiation such as sunlight. Moreover, even in cases where the structure is subjected to primer treatment using an epoxy-amine-based polymer, its contact with the adhesive sheet can be firmly maintained.

Examples of such a chemical species that generates a basic substance by irradiation with ionizing radiation widely include those known as curing aids. In an embodiment of the present invention, a compound that generates an aliphatic amine by irradiation with ionizing radiation may be preferably used. Since such a compound has a higher solubility than base-generating compounds that generate aromatic amines, and the concentration of the base-generating compound can therefore be relatively increased therewith, the thermosetting performance can be increased even at a low temperature. In an embodiment of the present invention, a base-generating compound represented by the following General Formula (I) may be especially preferably used.

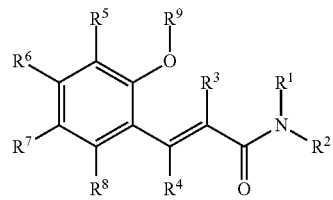

(I)

(wherein $R^1$ and $R^2$ each independently represent hydrogen, or a linear or branched hydrocarbon group optionally containing a substituent, and/or optionally containing an unsaturated bond, with the proviso that at least one of $R^1$ and $R^2$ is the hydrocarbon group, wherein $R^1$ and $R^2$ optionally bind to each other to form a cyclic structure;

$R^3$ and $R^4$ each independently represent hydrogen or a monovalent substituent;

$R^5$ to $R^8$ each independently represent hydrogen or a monovalent substituent, wherein two or more of $R^5$ to $R^8$ optionally bind to each other to form a cyclic structure(s); and $R^9$ represents a protecting group whose deprotection is possible by heating or irradiation with ionizing radiation).

The base-generating compound described above does not show activity under normal conditions at normal temperature and pressure. However, when it is irradiated with ionizing radiation as an external stimulus, the (—CH═CH—C(═O)—) moiety is isomerized into a cis isomer, and cyclization occurs due to heating, to produce an amine (NHR$^1$R$^2$) which is a base. This base-generating compound slowly produces the amine by the irradiation with ionizing radiation, curing reaction of the ionizing-radiation-curable resin relatively slowly proceeds. The compound therefore also functions as cure-retarding means.

In the General Formula (I), $R^1$ and $R^2$ each independently represent hydrogen, or a hydrocarbon group which may have a monovalent substituent, and/or may contain an unsaturated bond. In particular, in cases where both $R^1$ and $R^2$ are monovalent substituents, the sensitivity for isomerization can be improved, and a secondary amine is generated as the base, so that the basicity can be increased compared to cases where a primary amine is generated, and the catalytic activity can be high even with a low heating temperature. In view of this, both $R^1$ and $R^2$ are preferably monovalent substituents.

In particular, in cases where at least one of $R^1$ and $R^2$ is a methyl group which may be substituted by a halogen atom, the steric size in the vicinity of the amide bond can be small, so that the photoisomerization reaction easily proceeds, and therefore the sensitivity for isomerization increases. By the reduction of the steric bulkiness of the basic substance generated, the amine generated can easily reacts with a compound having a mercapto group, so that the catalytic activity can be improved as a result. From this viewpoint, at least one of $R^1$ and $R^2$ is more preferably a methyl group which may be substituted by a halogen atom. In the at least one of $R^1$ and $R^2$ which is a methyl group which may be substituted by a halogen atom, examples of the halogen atom include a fluorine atom, chlorine atom, and bromine atom. From the viewpoint of improvement of the catalytic activity, the atom is especially preferably a fluorine atom or a chlorine atom, which has a smaller atomic radius. The number of halogen atoms substituted is preferably as small as possible from the viewpoint of improvement of the catalytic activity. The number of halogen atoms substituted is preferably not more than two, more preferably not more than 1. In particular, the methyl group which may be substituted by a halogen atom is especially preferably a methyl group from the viewpoint of improvement of the catalytic activity.

In cases where $R^1$ and $R^2$ are bound to each other to form a cyclic structure containing a nitrogen atom, the conjugated chain in the vicinities of the carbon-carbon double bonds easily expand, leading to a high sensitivity for isomerization. Moreover, since the amine generated can easily react with a compound having a mercapto group, the catalytic activity can be improved. From this viewpoint, $R^1$ and $R^2$ are preferably bound to each other to form a cyclic structure containing a nitrogen atom. The cyclic structure containing a nitrogen atom formed by the binding of $R^1$ and $R^2$ to each other is more preferably a 5- to 7-membered ring from the viewpoint of increasing the sensitivity for isomerization.

The hydrocarbon group may contain an unsaturated bond, and examples of the hydrocarbon group include alkyl, alkenyl, alkynyl, aryl, and aralkyl. Each of these hydrocarbon groups may contain a substituent therein. The hydrocarbon group may have a linear shape, or may be a linear chain containing a branched chain, wherein chains may be bound to each other to form a cyclic structure(s). The branched chain herein means a structure having a branched hydrocarbon group, and also means each branched hydrocarbon group contained in the structure. Hydrocarbon groups containing a substituent may be bound to each other to form a heterocycle(s). In the hydrocarbon group which may contain a substituent, two or more branched chains contained in the hydrocarbon group may be bound to each other to form a cyclic structure(s), or two or more branched chains containing a substituent may be bound to each other to form a heterocycle(s) containing a heteroatom. The cyclic structure may be a saturated or unsaturated alicyclic hydrocarbon, condensed ring, or heterocycle; or a structure formed by combination of two or more selected from the group consisting of the alicyclic hydrocarbon, condensed ring, and heterocycle. The cyclic structure in the present paragraph represents a cyclic structure in $R^1$ or $R^2$, wherein, for example, $R^1$ represents a cyclohexyl group. The cyclic structure in the present paragraph is not the above-mentioned cyclic structure containing a nitrogen atom formed by binding of $R^1$ and $R^2$ to each other.

Examples of the hydrocarbon group include alkyl, alkenyl, alkynyl, aryl, and aralkyl. Examples of these hydrocarbon groups include alkyl groups having 1 to 20 carbon atoms, such as methyl, ethyl, and propyl; alkenyl groups having 1 to 20 carbon atoms, such as vinyl and allyl; alkynyl groups having 1 to 20 carbon atoms, such as ethynyl and 2-propynyl; aryl groups having 6 to 20 carbon atoms, such as phenyl, naphthyl, biphenyl, tolyl, xylyl, and fluorenyl; aralkyl groups having 7 to 20 carbon atoms, such as benzyl, phenethyl, and 3-phenylpropyl; cycloalkyl groups having 4 to 23 carbon atoms, such as cyclopentyl and cyclohexyl; and cycloalkenyl groups having 4 to 23 carbon atoms, such as cyclopentenyl and cyclohexenyl.

In an embodiment of the present invention, the substituent means a non-hydrogen atom or an atomic group with which a hydrogen atom can be replaced. The substituent is not limited as long as it is a non-hydrogen atom or an atomic group with which a hydrogen atom can be replaced. Examples of the substituent include atomic groups represented by $-XR^{10}$. Here, X represents a direct bond or a divalent linking group, and $-XR^{12}$ is not limited as long as it is an atomic group in which the X is linked to a hydrogen atom, or to a non-hydrogen atom or an atomic group $R^{12}$ with which a hydrogen atom can be replaced (except for cases where X is a direct bond and $R^{12}$ is a hydrogen atom, that is, $-XR^{10}$ is a hydrogen atom).

The X is not limited as long as it is a direct bond or a divalent linking group. Examples of the X include a link to an oxygen atom and a link to a sulfur atom; atomic groups containing a carbon atom, silicon atom, oxygen atom, sulfur atom, nitrogen atom, and/or phosphorus atom; and atomic groups containing a carbon atom. Specific examples of the X include oxy, thio, carbonyl, oxycarbonyl, thiocarbonyl, oxythiocarbonyl, carbonyloxy, oxycarbonyloxy, carbonylthio, oxycarbonylthio, imino, oxyimino, carbonylimino, phosphono, phosphonato, sulfonyl, and sulfonyl.

$R^{10}$ is not limited as long as it is hydrogen, or a non-hydrogen atom or an atomic group with which a hydrogen atom can be replaced. Examples of $R^{10}$ include halogen atoms (-F, -Cl, -Br, -I); hydroxyl; mercapto; cyano; isocyano; nitro; nitroso; carboxyl; carboxylato; sulfo; sulfonato; phosphino; phosphinyl; phosphono group which may contain a substituent; hydrocarbon group which may contain a substituent and/or an unsaturated bond; silyl group which may contain a substituent and/or an unsaturated bond; and amino group which may contain a substituent. Preferred examples of the atom or the atomic group as the $R^{10}$ include the halogen atoms described above; hydroxyl; mercapto; cyano; isocyano; nitro; nitroso; hydrocarbon group which may contain a substituent and/or an unsaturated bond; silyl group which may contain a substituent and/or an unsaturated bond; and amino group which may contain a substituent.

In the hydrocarbon group which may contain a substituent and/or an unsaturated bond, a branched chain may be contained; two or more branched chains may be bound to each other to form a cyclic structure(s); and/or two or more branched chains containing a substituent may be bound to each other to form a heterocycle(s). The heterocycle may or may not have aromaticity, and examples of the heterocycle include cyclic ether, lactone, lactam, and aromatic heterocycles. Examples of the hydrocarbon group which may contain a substituent and/or an unsaturated bond include alkyl, alkenyl, alkynyl, aryl, aralkyl, and heterocyclic groups. Examples of these hydrocarbon groups include alkyl groups having 1 to 20 carbon atoms, such as methyl, ethyl, and propyl; alkenyl groups having 1 to 20 carbon atoms, such as vinyl and allyl; alkynyl groups having 1 to 20 carbon atoms, such as ethynyl and 2-propynyl; aryl groups having 6 to 20 carbon atoms, such as phenyl, naphthyl, biphenyl, tolyl, xylyl, and fluorenyl; aralkyl groups having 7 to 20 carbon atoms, such as benzyl, phenethyl, and 3-phenylpropyl; cycloalkyl groups having 4 to 23 carbon atoms, such as cyclopentyl and cyclohexyl; cycloalkenyl groups having 4 to 23 carbon atoms, such as cyclopentenyl and cyclohexenyl; heterocyclic groups formed by removal of a hydrogen atom from a heterocycle such as ethylene oxide, trimethylene oxide, tetrahydrofuran, tetrahydropyran, β-propiolactone, γ-butyrolactone, σ-valerolactone, ε-caprolactone, β-propiolactam, γ-butyrolactam, σ-valerolactam, ε-caprolactam, furan ring, thiophen ring, 2H-pyran ring, 4H-thiopyran ring, benzofuran ring, 1-benzothiophene ring, 2H-chromene ring, 1H-2-benzopyran ring, xanthene ring, or thianthrene ring; alkyloxyalkyl groups having 2 to 20 carbon atoms, such as methoxymethyl, ethoxymethyl, and propoxymethyl; and aryloxyalkyl groups having 7 to 26 carbon atoms, such as phenoxymethyl, 2-phenoxyethyl, and 4-phenoxybutyl. Examples of the substituent which may be contained may be the same as those for the substituent —$XR^{10}$.

Examples of the silyl group which may contain a substituent and/or an unsaturated bond include alkylsilyl groups such as trimethylsilyl, triethylsilyl, and triisopropylsilyl; and alkoxysilyl groups such as trimethoxysilyl, dimethoxymethyl, and methoxydimethyl. Examples of the substituent which may be contained may be the same as those for the substituent —$XR^{10}$.

Examples of the amino group which may contain a substituent and/or bonding of a heteroatom in $R^{10}$ (—NH(—RH), —N(—$R^{12}$)(—$R^{13}$)) include hydrocarbon groups wherein $R^{11}$, $R^{12}$, and/or $R^{13}$ may contain bonding of a heteroatom at the binding end to the nitrogen atom, and may contain a substituent. Examples of the hydrocarbon groups which may contain bonding of a heteroatom at the binding end to the nitrogen atom, and may contain a substituent, may be the same as those for the substituent —$XR^{10}$ as long as bonding to the nitrogen atom is possible.

Preferred examples the amino group which may contain a substituent, and may contain bonding of a heteroatom, include N-alkylamino, N,N-dialkylamino, N-arylamino, N,N-diarylamino, N-alkyl-N-arylamino, acylamino, N-alkylacylamino, N-arylacylamino, alkoxycarbonylamino, aryloxycarbonylamino, N-alkyl-N-alkoxycarbonylamino, N-alkyl-N-aryloxycarbonylamino, N-aryl-N-alkoxycarbonylamino, and N-aryl-N-aryloxycarbonylamino.

The substituent: —$XR^{10}$ is not limited as long as it is an atomic group in which X, which is a direct bond or a divalent linking group, is linked to hydrogen, or to a non-hydrogen atom or an atomic group $R^{10}$ with which a hydrogen atom can be replaced. Examples of —$XR^{10}$ include halogen atoms (—F, —Cl, —Br, —I); hydroxyl; mercapto; cyano; isocyano; nitro; nitroso; carboxyl; carboxylato; sulfo; sulfonato; phosphino; phosphinyl; phosphono; hydrocarbon groups which may contain the substituent described above and/or an unsaturated bond (which may be hereinafter referred to as "above-mentioned hydrocarbon group"); silyl groups which may contain the substituent described above and/or an unsaturated bond; amino groups which may contain the substituent described above; alkoxy groups having 1 to 20 carbon atoms, such as methoxy, ethoxy, isopropoxy, t-butoxy, ethylhexyloxy, and cyclohexyloxy (—$OR^{14}$: $R^{14}$ represents the above-mentioned hydrocarbon group); aryloxy groups such as benzyloxy and naphthyloxy (—OAr: Ar represents aryl which may have a substituent); acyloxy groups such as acetoxy and benzoyloxy (—$OCOR^{15}$: $R^{15}$ represents the above-mentioned hydrocarbon group); carbamoyloxy (—$OCONR^{16}R^{17}$: $R^{16}$ and $R^{17}$ each represent the above-mentioned hydrocarbon group which may be the same or different, and may be bound to each other); cyanooxy (cyanato) (—OCN); thioalkoxy groups having 1 to 20 carbon atoms, such as methylthio and ethylthio (—$SR^{18}$: $R^{18}$ represents the above-mentioned hydrocarbon group); arylthio groups such as benzylthio and naphthylthio (—SAr: Ar represents aryl which may have a substituent); acylthio groups such as acetylthio and benzoylthio (—$SCOR^{19}$: $R^{19}$ represents the above-mentioned hydrocarbon group); cyanothio (thiocyanato) (—SCN); formyl (—COH); acyl (—$COR^{20}$: $R^{20}$ represents the above-mentioned hydrocarbon group); alkoxycarbonyl (—$COOR^{21}$: $R^{21}$ represents the above-mentioned hydrocarbon group); aryloxycarbonyl groups such as benzyloxycarbonyl (—COOAr: Ar represents aryl which may have a substituent); carbamoyl (—$CONR^{22}R^{23}$: $R^{22}$ and $R^{23}$ each represent the above-mentioned hydrocarbon group which may be the same or different, and may be bound to each other); thioacyl (—$CSR^{24}$: $R^{24}$ represents the above-mentioned hydrocarbon group); and alkoxythiocarbonyl (—$CSOR^{25}$: $R^{25}$ represents the above-mentioned hydrocarbon group).

More preferred examples of —$XR^{10}$ include hydroxyl; mercapto; cyano; isocyano; hydrocarbon groups which may contain the substituent described above; silyl groups which may contain the substituent described above; alkoxy; aryloxy; acyloxy, carbamoyloxy, cyanooxy (cyanato), thioalkoxy, arylthio, acetylthio, acylthio, cyanothio (thiocyanato), formyl, acyl, alkoxycarbonyl, aryloxycarbonyl, carbamoyl, thioacyl, and alkoxythiocarbonyl. Still more preferred examples of —$XR^{10}$ include hydroxyl, mercapto, alkoxy, aryloxy, thioalkoxy, and arylthio. Use of amines containing these substituents leads to improved solubility.

$NHR^{1}R^{2}$ is a base ("basic substance" is simply referred to as "base" in an embodiment of the present invention). In cases where $R^{1}$ and/or $R^{2}$ contain(s) an amino group, the base-generating compound itself may be a base, and may react with an epoxy group, leading to deterioration of its stability over time. In view of this, both $R^{1}$ and $R^{2}$ are preferably organic groups containing no amino group. On the other hand, not all of amino groups deteriorate the stability over time. In cases where all amino groups are in a state where a residue(s) other than $R^{1}$ and/or $R^{2}$ in the above General Formula (I) is/are further bound to one or more termini of $R^{1}$ and/or $R^{2}$ in General Formula (I), the stability over time is not deteriorated even in cases where $R^{1}$ and/or $R^{2}$ contain(s) an amino group.

$R^{3}$ and $R^{4}$ in the above General Formula (I) may be selected from hydrogen and the same substituents as those for $R^{1}$ and $R^{2}$. From the view point of easy achievement of high sensitivity, both $R^{3}$ and $R^{4}$ are preferably hydrogen.

On the other hand, in cases where at least one of $R^{3}$ and $R^{4}$ in General Formula (I) is a particular substituent described above rather than hydrogen, the solubility in an organic solvent increases, and the affinity to a macromolecular precursor increases compared to cases where both $R^{3}$ and $R^{4}$ are hydrogen. For example, in cases where at least one of $R^{3}$ and $R^{4}$ is a hydrocarbon group which may have a substituent such as alkyl or aryl, and which may contain an unsaturated bond, the solubility in an organic solvent increases.

In the above General Formula (I), $R^{5}$ to $R^{8}$ each independently represent hydrogen or a monovalent substituent. $R^{5}$ to $R^{8}$ may be the same or different, and two or more of these may bind to each other to form a cyclic structure(s). The above-mentioned substituents for —$XR^{10}$ may also be used as substituents for $R^5$ to $R^8$.

Preferably, from the viewpoint of achievement of improved solubility and high sensitivity, $R^5$ to $R^8$ have one or more monovalent substituents, or two or more of $R^5$ to $R^8$ are bound to each other to form a cyclic structure(s). In the structure of General Formula (I), there are several factors which efficiently promote the isomerization reaction from the trans isomer to the cis isomer by the double bond between the α-carbon and the β-carbon positioned at the α-position and the β-position of the carbonyl bond. Examples of such factors include the degree of steric hindrance in the vicinity of the carbon-carbon double bond, and the electronic state of the conjugated chain that expand in the vicinity of the carbon-carbon double bond. By the introduction of at least one substituent to the substituents $R^5$ to $R^8$, or by forming a cyclic structure(s) by bonding of two or more of $R^5$ to $R^8$ to each other, the conjugated chain in the vicinity of the carbon-carbon double bond can be expanded, and hence the sensitivity for generation of the base can be improved. Further, by the introduction of at least one substituent to the substituents $R^5$ to $R^8$, the wavelength of the light absorbed can be controlled. The compound can therefore be made to absorb a desired wavelength by the introduction of the substituent(s). By introducing a substituent that extends the conjugated chain of the aromatic ring, the absorption wavelength can be shifted toward longer wavelength. This also enables improvement of the solubility, and the compatibility between the compound having two or more epoxy groups and the compound having a mercapto group used in combination.

In the General Formula (I), $R^9$ represents a hydrogen atom, or a protecting group whose deprotection is possible by irradiation with ionizing radiation. $R^9$ is more specifically described in WO 2010/113813. The term "deprotection is possible" means that there is a possibility that —$OR^9$ may change into —OH. In cases where $R^9$ is a hydrogen atom, the base-generating compound contains a phenolic hydroxyl group, so that the shelf stability may be deteriorated.

On the other hand, in cases where $R^9$ is the protecting group described above, deprotection occurs by irradiation with ionizing radiation, to produce hydroxyl groups. By the protection of the phenolic hydroxyl group with the protecting group whose deprotection is possible by irradiation with ionizing radiation, chlorine generators having the protecting group as $R^9$ have an advantage that they have very high shelf stability. However, there are also drawbacks in that the residue after the deprotection reaction may cause degassing; deprotection may be required as an extra process; and the cost increases because of the introduction of the protecting group. Thus, whether or not the protecting group is to be introduced as $R^9$ needs to be appropriately selected depending on the use. In the base-generating compound used in an embodiment of the present invention, $R^9$ may be used without limitation as long as it is a protecting group for a phenolic hydroxyl group whose deprotection is possible by irradiation with ionizing radiation under conditions where the amide group present in the General Formula (I) is not degraded. For example, amide bonds are degraded by heating under strongly acidic conditions in the presence of, for example, a strong Lewis acid such as boron tribromide or aluminum trichloride, or a strong acid such as sulfuric acid, hydrochloric acid, or nitric acid, or by heating under strongly basic conditions in the presence of a strong base such as sodium hydroxide. $R^9$ is appropriately selected for the purpose of, for example, improving the solubility and/or the compatibility, and/or changing the reactivity during the synthesis, depending on the type of the compound used in combination with the base-generating compound, the method of application of the base-generating compound, and/or the synthesis method.

The base-generating compound represented by the General Formula (I) described above may have a chemical structure which is a trans isomer or a cis isomer. In an embodiment of the present invention, a trans isomer alone may be used, or a mixture of a trans isomer and a cis isomer may be used.

Preferred examples of the base-generating compound used in an embodiment of the present invention include the base-generating compound represented by the following General Formula (II).

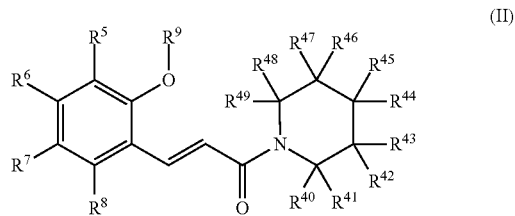

(II)

In the formula, $R^{40}$ to $R^{49}$ each independently represent hydrogen or a substituent.

A method for synthesizing the base-generating compound represented by the General Formula (II) is described below taking the base-generating compound of the following General Formula (III) as an example. It should be noted that the method for synthesizing the base-generating compound represented by the General Formula (II) is not limited thereto, and the compound may be synthesized by a plurality of conventionally known methods.

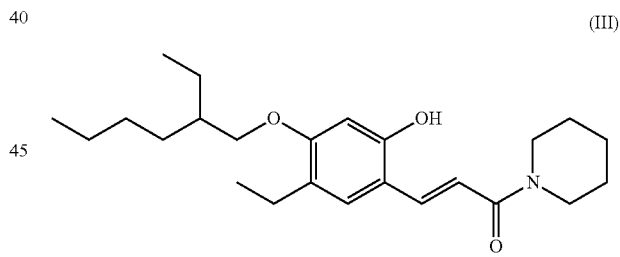

(III)

The base-generating compound represented by General Formula (III) can be synthesized by, for example, the following method. First, ethoxycarbonylmethyl(triphenyl) phosphonium bromide and 2-hydroxy-4-(5-ethylhexyloxy)-5-ethylbenzaldehyde are dissolved in methanol, and a solution of potassium carbonate in methanol is slowly added dropwise to the resulting solution, followed by stirring the resulting mixture. After confirming completion of the reaction by thin-layer chromatography (hereinafter referred to as "TLC"), filtration is performed to remove potassium carbonate, followed by concentration under reduced pressure. Thereafter, an aqueous sodium hydroxide solution is added to the resulting concentrate, and the resulting mixture is stirred. After completion of the reaction, triphenylphosphine oxide is removed by filtration, and concentrated hydrochloric acid is added dropwise thereto to make the reaction liquid acidic. The resulting precipitate is collected by filtration, and then washed with a small amount of chloroform, to obtain 2-hydroxy-4-(5-ethylhexyloxy)-5-ethylcinnamic acid. Subsequently, under nitrogen atmosphere, the 2-hydroxy-4-(5-ethylhexyloxy)-5-ethylcinnamic acid obtained as described above is dissolved in dry tetrahydrofuran, and 1-ethyl-3-(3-dimethylaminopropyl)carbodiimide hydrochloride is added to the resulting solution in an ice bath. Thereafter, piperidine is added to the resulting mixture, and the mixture is stirred overnight. After the reaction, the reaction solution is concentrated, and dissolved in water. The resulting solution is subjected to extraction with chloroform, and then to washing with an aqueous hydrogen carbonate solution, hydrochloric acid, and then saturated brine. The washed solution is dried over sodium sulfate, and then concentrated, to obtain the base-generating compound represented by the General Formula (III). The base-generating compound represented by the General Formula (III) synthesized generates piperidine as a base.

As described above, a base-generating compound that generates a desired base can be easily synthesized. For example, in cases where 4-hydroxypiperidine is to be generated as the base, a base-generating compound in which $R^{44}$ is hydroxyl and $R^{45}$ is a hydrogen atom may be synthesized. In such cases, the synthesis may be carried out by the same method as described above except that 4-hydroxypiperidine is added instead of piperidine.

In cases where the base-generating compound is used in combination with the later-described compound having a mercapto group, the content of the base-generating compound is preferably not less than 0.5% by mass and not more than 10% by mass with respect to the ionizing-radiation-curable resin (for example, epoxy resin).

Examples of such a base-generating compound include those commercially available, such as WPBG300, nonionic PBG, ionic PBG, WPBG018, and WPBG140, which are commercially available from Wako Pure Chemical Industries, Ltd.; PBG (oxime ester photobase generator), which is commercially available from ADEKA Corporation; and EIPBG, which is commercially available from EIWEISS Chemical Corporation.

Besides the curing aid, the adhesive layer may comprise a curing agent for curing of the ionizing-radiation-curable resin. For example, the layer may comprise a compound having a mercapto group. The inclusion of such a compound enables curing of the ionizing-radiation-curable resin in the adhesive layer even in an environment at a relatively low temperature. Such a compound may be a conventionally known compound as long as the molecule has two or more mercapto groups therein. A compound having not less than three mercapto groups in the molecule is more preferred. In cases where the number of the mercapto group(s) is one, the reaction points with the curable compound may decrease, leading to low adhesiveness and durability.

Among the compounds having a mercapto group, known examples of dithiols include 1,3-butanedithiol, 1,4-butanedithiol, 2,3-butanedithiol, 1,2-benzenedithiol, 1,3-benzenedithiol, 1,4-benzenedithiol, 1,10-decanedithiol, 1,2-ethanedithiol, 1,6-hexanedithiol, 1,9-nonanedithiol, 1,8-octanedithiol, 1,5-pentanedithiol, 1,2-propanedithiol, 1,3-propanedithiol, toluene-3,4-dithiol, 3,6-dichloro-1,2-benzenedithiol, 1,3,5-triazine-2,4,6-trithiol(trimercapto-triazine), 1,5-naphthalenedithiol, 1,2-benzenedimethanethiol, 1,3-benzenedimethanethiol, 1,4-benzenedimethanethiol, 4,4'-thiobisbenzenethiol, 2-di-n-butylamino-4,6-dimercapto-s-triazine, trimethylolpropanetris($\beta$-thiopropionate), 2,5-dimercapto-1,3,4-thiadiazol, 1,8-dimercapto-3,6-dioxaoctane, and 1,5-dimercapto-3-thiapentane.

Known examples of trithiols include trithioglycerine, 1,3,5-triazine-2,4,6-trithiol(trimercapto-triazine), trimethylolpropane tris(thioglycolate), trimethylolpropane tris(propionate), 1,2,4-tris(mercaptomethyl)benzene, 1,3,5-tris(mercaptomethyl)benzene, 2,4,6-tris(mercaptomethyl) mesitylene, tris(mercaptomethyl)isocyanurate, tris(3-mercaptopropyl)isocyanurate, and 2,4,5-tris(mercaptomethyl)-1,3-dithiolan.

Known examples of tetrathiols include pentaerythritol tetrakis(thioglycolate), pentaerythritol tetrakis(thiopropionate), 1,2,4,5-tetrakis(mercaptomethyl)benzene, tetramercaptobutane, and pentaerythrithiol.

The content of the curing agent needs to be appropriately set depending on the use of interest. The curing agent is preferably added such that the active hydrogen equivalent is not less than 0.7 equivalent and not more than 1.2 equivalents with respect to 1 epoxy equivalent of the curable compound. In cases where the content of the compound having a mercapto group is not less than 0.7 equivalent, a favorable curing performance can be obtained even at relatively low temperature, and an effect to achieve excellent adhesion strength after the curing can be remarkably produced. On the other hand, in cases where the content of the compound having a mercapto group exceeds 1.2 equivalents, there may be disadvantages such as low initial adhesiveness, low adhesiveness, and high cost.

The adhesive layer constituting the adhesive sheet may comprise another component, if necessary, as long as the object of the present invention is not deteriorated. Examples of such a component include additives such as coupling agents and leveling agents to be added for improvement of the contact with the structure. In addition, the layer may comprise a tackifier for increasing the adhesive force, and may comprise a filler and/or the like for improving the shear strength.

Examples of the tackifier include one or more selected from, for example, rosin resins, modified rosin resins, terpene resins, terpene phenol resins, aromatic modified terpene resins, C5 and C9 petroleum resins, and coumarone resins.

Examples of the filler include one or more selected from, for example, inorganic fillers such as silica, clay, glass balloon, alumina, and ceramic balloon; organic fillers such as nylon beads, acryl beads, and silicone beads; and filaments formed from glass, polyester, rayon, nylon, cellulose, acetate, or the like.

The thickness of the adhesive layer 2 is preferably not less than 50 μm and not more than 500 μm, more preferably not less than 100 μm and not more than 300 μm. In cases where the thickness of the adhesive layer is less than 50 μm, the layer is thin, and its adhesive force and adhesive force may therefore be insufficient. On the other hand, in cases where the thickness of the adhesive layer exceeds 500 μm, the curing reaction of the adhesive layer may not sufficiently proceed in its inside, and/or the curing reaction may be long.

Figure 2:
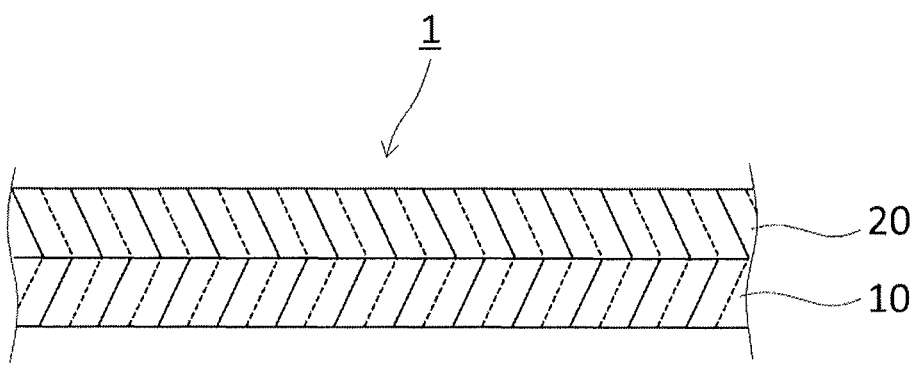
FIG. 2 is a schematic cross-sectional view of another embodiment of the adhesive sheet used in the method for repairing or reinforcing a structure according to an embodiment of the present invention.

The adhesive sheet 1 described above may be composed of an adhesive layer 10 alone as shown in FIG. 1, or a release sheet 20 may be provided on one side of the adhesive layer 10 as shown in FIG. 2. Alternatively, release sheets 20 and 20' may be provided on both sides of the e adhesive layer 10. The release sheet is not limited as long as it has strength and flexibility sufficient for protecting the adhesive layer 10, and various films may be used therefor. Examples the release sheet include films and sheets comprising one or more of known resins such as polyester resins, polypropylene resins, polyvinyl chloride resins, fluorocarbon resins, polystyrene resins, polyacrylic resins, cellulose resins, polycarbonate resins, polyamide resins, polyolefin resins, polyvinyl alcohol resins, polyimide resins, phenol resins, and polyurethane resins.

In the release sheet described above, the surface contacting the adhesive layer is preferably subjected to easy-release treatment. For example, in the easy-release treatment, an easy-release layer (not shown) is preferably provided. The easy-release layer is provided by application of a release agent. The release agent is not limited, and various release agents may be used. Examples of the release agent include water-soluble resins, hydrophilic resins, waxes, silicone resins, fluorocarbon resins, aminoalkyd resins, melamine resins, polyester resins, and acrylic resins. The method of application of the release agent is not limited, and examples of the method include application methods such as roll coating, gravure coating, and spray coating.

The surface of the release sheet 20 on the side on which the easy-release layer is formed is preferably preliminarily subjected to easy-adhesion treatment for increasing adhesiveness of the easy-release layer. The easy-adhesion treatment is preferably a treatment that increases wettability of the release agent. Examples of such a treatment include corona discharge treatment, plasma treatment, ozone treatment, flame treatment, preheat treatment, dustproof treatment, vapor deposition treatment, and alkali treatment.

The thickness of the release sheet 20 is not limited. For example, the thickness is preferably not less than 5 μm and not more than 200 μm.

Figure 4:
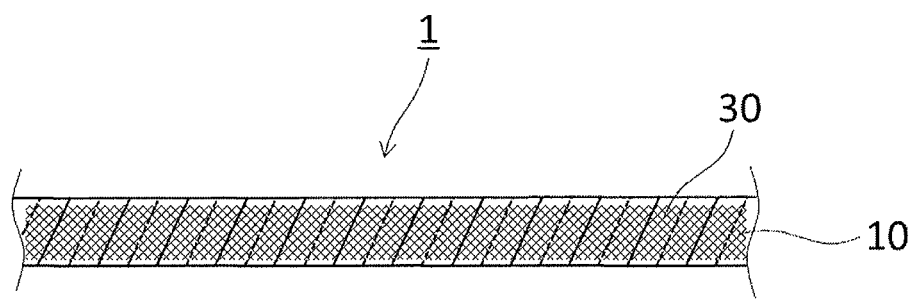
FIG. 4 is a schematic cross-sectional view of another embodiment of the adhesive sheet used in the method for repairing or reinforcing a structure according to an embodiment of the present invention.

As shown in FIG. 4, in the adhesive sheet 1, the adhesive layer 10 may comprise a repair or reinforcing member 30 such as a fiber material. The adhesive layer may be formed, for example, by impregnation of a fiber material with a adhesive layer-forming material comprising the ionizing-radiation-curable resin composition and the curing aid, or by application of such a adhesive layer-forming material to a fiber material. Examples of such a repair or reinforcing member include, but are not limited to, one or more selected from woven fabrics, knits, non-woven fabrics, laminated fabrics, synthetic resin foams, papers, and the like. Examples of the constituting material of such a fiber material layer include one or more selected from polyester fibers, polyamide fibers, aramid fibers, vinylon fibers, carbon fibers, glass fibers, and polyolefin fibers. Among these, polyester fibers, polyamide fibers, aramid fibers, vinylon fibers, and polyolefin fibers are preferably used because of their lightness and excellent strength. These fibers may be blended, may be separately used for warp and weft yarns, or may be layered on each other.

Figure 5:
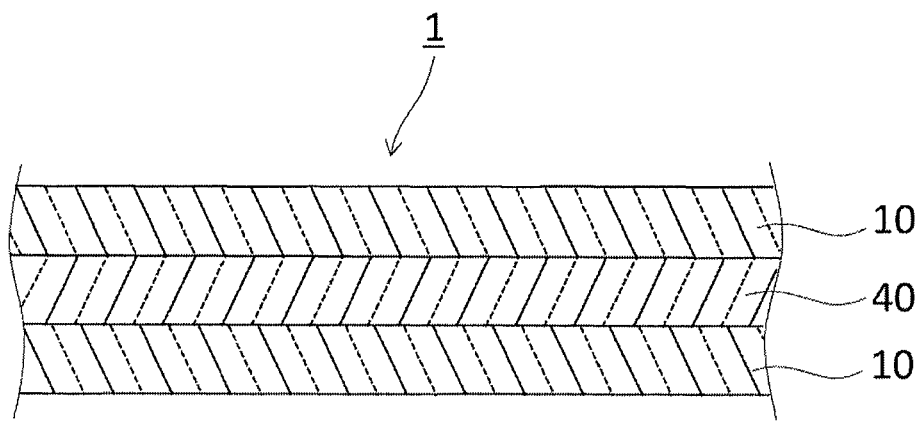
FIG. 5 is a schematic cross-sectional view of another embodiment of the adhesive sheet used in the method for repairing or reinforcing a structure according to an embodiment of the present invention.

As shown in FIG. 5, in the adhesive sheet 1, two adhesive layers 10 may be provided via a repair or reinforcing member 40 such as a resin film. Examples of the repair or reinforcing member such as a resin film include sheets and films comprising, for example, one or more of polyester resins, polypropylene resins, polyvinyl chloride resins, fluorocarbon resins, polystyrene resins, polyacrylic resins, cellulose resins, polycarbonate resins, polyamide resins, polyolefin resins, polyvinyl alcohol resins, polyimide resins, phenol resins, and polyurethane resins. The repair or reinforcing member 40 may be one which is capable of giving a function at the same time, and examples of such a repair or reinforcing member include advertising signs, coated films, waterproof sheets, water-absorbent sheets, ultraviolet-resistant sheets, water-retaining sheets, and colored sheets.

Such a repair or reinforcing member such as a resin film is appropriately selected depending on its use in repair/reinforcement of a structure. The thickness of the repair or reinforcing member such as a resin film also varies depending on whether the member is used for repair or for reinforcement. The thickness is usually not less than 0.01 mm and not more than 1.0 mm.

[Primer Treatment Step]

In an embodiment of the present invention, a surface(s) of the structure may be subjected to primer treatment before the later-described step of attaching a adhesive sheet. By the primer treatment, the contact between the structure and the adhesive sheet can be made firmer.

The structure to be subjected to the primer treatment is the subject of repair/reinforcement, and examples of the structure include a number of social infrastructures such as bridges, tunnels, road pavement, river management facilities, erosion control dams, erosion control consolidation works, sewer pipes, sewage treatment plants, harbor facilities, public housing, apartment houses, conventional homes, urban parks, coastal embankments, airports, beacons, and government facilities. Since most of them are concrete structures, concrete (including reinforced concrete) is described below as an example of the structure.

As the contact aid used for the primer treatment, various conventionally known primers such as urethane primers, epoxy primers, and vinyl ester primers may be used without limitation. Since, in an embodiment of the present invention, a basic-substance-generating compound is used as the curing aid for the ionizing-radiation-curable resin as described above, the contact aid is not deteriorated even if a primer containing an epoxy resin and a polyamine-based curing agent is used as the contact aid, unlike cases where an acidic-substance-generating compound is used as the curing aid.

Examples of the epoxy resin contained in the primer include glycidyl ether type epoxy resins such as bisphenol A type epoxy resins, bisphenol F type epoxy resins, and phenol novolak type epoxy resins; glycidyl ester type epoxy resins such as hexahydrophthalic acid glycidyl ester and dimer acid glycidyl ester; glycidyl amine type epoxy resins such as triglycidyl isocyanurate and tetraglycidyldiaminodiphenylmethane; linear aliphatic epoxides such as epoxidized polybutadiene and epoxidized soybean oil; and alicyclic epoxides such as 3,4-epoxy-6-methylcyclohexylmethylcarboxylate and 3,4-epoxycyclohexylmethylcarboxylate.

As the curing agent contained in the primer, a polyamine-based curing agent which is in a liquid state at normal temperature may be preferably used. Examples of the curing agent include aliphatic polyamines, alicyclic polyamines, aromatic polyamines, polyamide polyamines, and polymer-captans. The primer may also comprise one or more of conventionally known additives such as diluents, thixotropy imparting agents, and coupling agents.

As the epoxy-amine-based primer, a commercially available product may be used. Examples of such a product that may be preferably used include ALPRON W301, provided from Nichibei Resin Co., Ltd., and Primer II for reinforced concrete, provided from Mizutani Paint Co., Ltd. The primer treatment may be carried out by applying the primer to a surface of the concrete structure, and then drying it. For example, the primer may be applied to the surface of the concrete structure by means such as a brush or a roller. The thickness of the primer layer is preferably not less than about 1 μm and not more than about 1 mm.

[Step of Attaching Adhesive Sheet]

Figure 3:
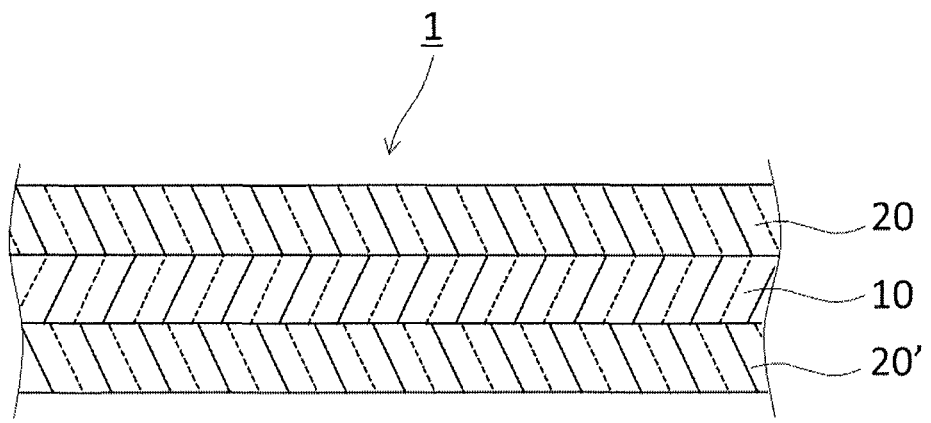
FIG. 3 is a schematic cross-sectional view of another embodiment of the adhesive sheet used in the method for repairing or reinforcing a structure according to an embodiment of the present invention.

After providing the adhesive sheet, the adhesive sheet is attached to the surface of the structure, and the adhesive sheet is brought into close contact with the structure. In cases where the embodiment of the adhesive sheet 1 is as shown in FIG. 2, the surface of the adhesive layer 10 on which the release sheet 20 is not provided is attached to the structure. In cases where the embodiment is as shown in FIG. 3, one release sheet 20' is released from the adhesive sheet, and the exposed surface of the adhesive layer 10 is attached to the structure. Since, in an embodiment of the present invention, as described above, the adhesive layer of the adhesive sheet has adhesive force, the sheet can be temporarily fixed to the surface of the structure by attachment thereto. Thus, there is no need to attach the adhesive sheet using an adhesive or the like. Further, since reattachment of the adhesive sheet is possible after its attachment and removal, the sheet has excellent operability. Moreover, since slow curing of the adhesive layer is possible after the temporary fixation by attachment of the adhesive sheet, there is no need to cure the adhesive layer using a UV illuminator or the like, unlike conventional cases.

[Curing Step]

After the attachment of the adhesive sheet to the surface of the structure, curing of the adhesive layer is carried out. The curing of the adhesive layer is carried out by irradiation with ionizing radiation. In an embodiment of the present invention, as described above, the curing reaction of the ionizing-radiation-curable resin is carried out using a basic-substance-generating compound. Therefore, the curing is carried out in a state where the adhesive layer is exposed. That is, in cases where the adhesive sheet 1 has a release sheet 20 as shown in FIG. 2, curing of the adhesive layer 10 is carried out after removal of the release sheet 20, unlike in conventional methods for repair/reinforcement. Thus, according to an embodiment of the present invention, even in cases where curing of the adhesive layer takes a long time, for example, even in cases where the adhesive layer is cured by irradiation with ionizing radiation such as sunlight, the step of removing the release sheet after the curing can be omitted, so that the workload for performing repair/reinforcement can be reduced.

Examples of the ionizing radiation include microwaves, infrared rays, visible rays, ultraviolet rays, X-rays, and γ-rays. Among these, ultraviolet rays may be preferably used. Depending on the type of the curing aid contained in the adhesive layer, the adhesive layer can be cured using an ultraviolet ray having a wavelength of 300 to 370 nm with a cumulative amount of light of not less than about 50 mJ/cm$^2$ and not more than about 3000 mJ/cm$^2$. That is, the adhesive layer can be cured also by light such as sunlight. In such a case, the time required for complete curing of the adhesive layer is about one day. In an embodiment of the present invention, of course, the adhesive layer may be cured for a longer time, or the curing time may be reduced using a UV illuminator or a heater. Instead of irradiation with an ultraviolet ray, irradiation with an electron beam may be carried out for the curing of the adhesive layer. In such a case, the irradiation dose may be not less than about 50 kGy and not more than about 100 kGy.

Third Embodiment of Present Invention

Figure 6:
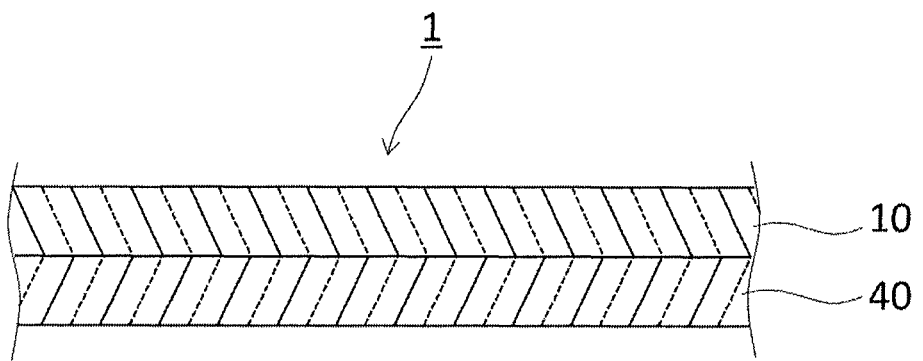
FIG. 6 is a schematic cross-sectional view of another embodiment of the adhesive sheet used in the method for repairing or reinforcing a structure according to an embodiment of the present invention.

The method for repairing or reinforcing a structure according to the third embodiment of the present invention comprises the steps of: 1) applying a primer comprising an epoxy resin and a polyamine-based curing agent to a surface of the structure, to perform primer treatment; 2) attaching an adhesive layer of an adhesive sheet to the surface of the structure subjected to the primer treatment, the adhesive layer comprising at least a curable resin composition whose curing is promoted by irradiation with ionizing radiation and a curing aid which generates a basic substance by irradiation with ionizing radiation; and 3) curing the adhesive layer. This embodiment is different from the first and second embodiments in that the curing of the adhesive layer is not carried out in a state where the adhesive layer is exposed. In the third embodiment, an adhesive sheet 1 in which a repair or reinforcing member 40 is provided on one surface of an adhesive layer as shown in FIG. 6 is used, and the surface of the adhesive layer 10 on which the repair or reinforcing member 40 is not provided is attached to the structure, followed by curing the adhesive layer 10 in a state where the adhesive layer 10 is not exposed (that is, in a state where the adhesive layer 10 is covered with the repair or reinforcing member 40). In such a case, the adhesive layer is not exposed to the air, so that the influence of inhibition of the curing by oxygen in the air is small. Thus, it is also possible to use an acidic-substance-generating compound as the curing aid for the ionizing-radiation-curable resin. However, since, in an embodiment of the present invention, a basic-substance-generating compound is used as the curing aid as described above, the contact aid is not deteriorated even if a primer comprising an epoxy resin and a polyamine-based curing agent is used as the contact aid, unlike cases where an acidic-substance-generating compound is used as the curing aid.

Alternatively, in the third embodiment, after attaching the adhesive sheet 1 of the embodiment shown in FIG. 1 to the structure, the repair or reinforcing member described above may be provided on the surface of the adhesive layer 10 before curing of the adhesive layer 10.

EXAMPLES

The present invention is described below more concretely by way of Examples. However, the present invention is not limited, within the spirit of the present invention, to the descriptions in the following Examples.

Example 1

<Preparation of Adhesive Sheets>

To the release-treated surface of a polyester film (trade name: SP-PET-03; film thickness, 38 μm; manufactured by Tohcello Co., Ltd.) which is a release sheet whose one side is subjected to release treatment using a silicone release agent, the following coating liquid 1 for formation of an adhesive layer was applied to a thickness after application of 200 μm using an applicator, and the resulting sheet was dried in a drying oven at 80° C. for 2 minutes, to form an adhesive layer. Two such sheets were provided, and carbon fibers (W-3101, manufactured by Toho Tenax Co., Ltd.) as the core were embedded in the adhesive layer of one of the sheets at normal temperature using a 2-kg roller. On the resulting sheet, the other sheet was placed such that the adhesive layers face to each other. The stacked sheets were pressed on a hot plate at about 60° C. using a 2-kg roller, to prepare an adhesive sheet provided with release sheets on both sides thereof.

| <Composition of Coating Liquid 1 for Formation of Adhesive Layer> | |
|---|---|
| Liquid epoxy resin | 100 parts by mass |
| (bisphenol A type epoxy resin; epoxy equivalent, 190 g/eq.; molecular weight, 380; manufactured by Mitsubishi Chemical Corporation; trade name, jER828) | |
| Curing agent having a mercapto group | 7.0 parts by mass |
| (pentaerythritol tetrakis-3-mercaptopropionate; viscosity, 400 to 550 mPa · s/ 25° C.; mercaptan equivalent, 125 to 137 g/eq; manufactured by Mitsubishi Chemical Corporation; trade name, QX40) | |
| Acrylic resin | 50 parts by mass |
| (a block copolymer of a modified methyl methacrylate having an amino group introduced-butyl acrylate-methyl methacrylate; Tg, −42° C.; manufactured by Arkema; trade name, M22N) | |
| Photobase generator A | 5 parts by mass |
| Dilution solvent | 100 parts by mass |
| (ethyl acetate, manufactured by DIC Graphics Corporation) | |

The photobase generator A was synthesized as follows. First, 15 mL of methanol was placed in a 100-mL flask, and 2.00 g of potassium carbonate was added thereto. Subsequently, 10 mL of methanol was placed in a 50-mL flask, and 2.67 g (6.2 mmol) of ethoxycarbonylmethyl(triphenyl)phosphonium bromide (manufactured by Tokyo Chemical Industry Co., Ltd.) and 1.7 g (6.2 mmol) of 2-hydroxy-4-(5-ethylhexyloxy)-5-ethylbenzaldehyde were added thereto, followed by allowing dissolution. Thereafter, the solution of potassium carbonate in methanol described above which was sufficiently stirred was slowly added dropwise thereto. After three hours of stirring, completion of the reaction was confirmed by TLC. Subsequently, potassium carbonate was removed by filtration, followed by concentration under reduced pressure. Thereafter, 50 mL of 1 N aqueous sodium hydroxide solution was added to the resulting concentrate, and the resulting mixture was stirred for 1 hour. After completion of the reaction, triphenylphosphine oxide was removed by filtration, and concentrated hydrochloric acid was added dropwise thereto to make the reaction liquid acidic. The resulting precipitate was collected by filtration, and then washed with a small amount of chloroform, to obtain 1.7 g of 2-hydroxy-4-(5-ethylhexyloxy)-5-ethylcinnamic acid. Subsequently, under nitrogen atmosphere in a 100-mL three-necked flask, 1.0 g (3.19 mmol) of the 2-hydroxy-4-(5-ethylhexyloxy)-5-ethylcinnamic acid was dissolved in 10 mL of dry tetrahydrofuran, and 0.73 g (3.83 mmol, 1.2 eq) of 1-ethyl-3-(3-dimethylaminopropyl)carbodiimide hydrochloride (manufactured by Tokyo Chemical Industry Co., Ltd.) was added to the resulting solution in an ice bath. Thirty minutes later, 129 mg (1.52 mmol, 0.95 eq) of piperidine (manufactured by Tokyo Chemical Industry Co., Ltd.) as an amine was added to the resulting mixture, and the mixture was then stirred overnight. After completion of the reaction, the reaction solution was concentrated, and dissolved in water. The resulting solution was subjected to extraction with chloroform, and then to washing with an aqueous hydrogen carbonate solution, 1 N hydrochloric acid, and then saturated brine. The washed solution was dried over sodium sulfate, and then concentrated, to obtain 1.0 g of the photobase generator A represented by Formula (I).

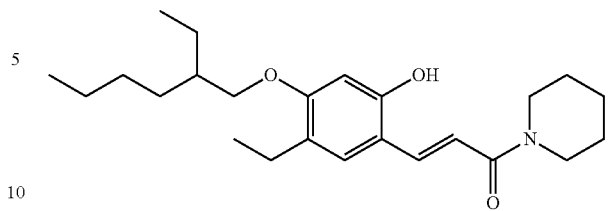

(I)

Example 2

An adhesive sheet was prepared in the same manner as in Example 1 except that the following coating liquid 2 for formation of an adhesive layer was used.

| <Composition of Coating Liquid 2 for Formation of Adhesive Layer> | |
|---|---|
| Solid epoxy resin | 100 parts by mass |
| (bisphenol A type epoxy resin; molecular weight, 5000; manufactured by Mitsubishi Chemical Corporation; trade name, jER1009) | |
| Curing agent having a mercapto group | 7.6 parts by mass |
| (pentaerythritol tetrakis-3-mercaptopropionate; viscosity, 400 to 550 mPa · s/ 25° C.; mercaptan equivalent, 125 to 137 g/eq; manufactured by Mitsubishi Chemical Corporation; trade name, QX40) | |
| Acrylic resin | 50 parts by mass |
| (block copolymer of modified methyl methacrylate having an amino group introduced-butyl acrylate-methyl methacrylate; Tg, −42° C.; manufactured by Arkema; trade name, M22N) | |
| Photobase generator A | 5 parts by mass |
| Dilution solvent | 100 parts by mass |
| (ethyl acetate, manufactured by DIC Graphics Corporation) | |

Comparative Example 1

An adhesive sheet was prepared in the same manner as in Example 1 except that the following coating liquid 3 for formation of an adhesive layer was used.

| <Composition of Coating Liquid 3 for Formation of Adhesive Layer> | |
|---|---|
| Solid epoxy resin | 50 parts by mass |
| (bisphenol A type epoxy resin; molecular weight, 5000; manufactured by Mitsubishi Chemical Corporation; trade name, jER1009) | |
| Liquid epoxy resin | 50 parts by mass |
| (bisphenol A type epoxy resin; epoxy equivalent, 190 g/eq.; molecular weight, 380; manufactured by Mitsubishi Chemical Corporation; trade name, jER828) | |
| Curing agent | 5 parts by mass |
| (photoacid generator, manufactured by Sanshin Chemical Industry Co., Ltd.; trade name, San-Aid SI60L) | |
| Dilution solvent | 100 parts by mass |
| (ethyl acetate, manufactured by DIC Graphics Corporation) | |

Comparative Example 2

An adhesive sheet was prepared in the same manner as in Example 1 except that the following coating liquid 4 for formation of an adhesive layer was used.

| <Composition of Coating Liquid 4 for Formation of Adhesive Layer> | |
| --- | --- |
| Liquid acrylic resin (acrylic acid mixture, manufactured by Nippon Synthetic Chemical Industry Co., Ltd.; UVNS034) | 100 parts by mass |
| Acrylic resin (a block copolymer of methyl methacrylate-butyl acrylate-methyl methacrylate; Tg, −42° C.; manufactured by Arkema; trade name, M22) | 50 parts by mass |
| Curing agent (photoradical initiator, manufactured by BASF; trade name, Irgacure 184) | 5 parts by mass |
| Dilution solvent (ethyl acetate, manufactured by DIC Graphics Corporation) | 100 parts by mass |

Comparative Example 3

Evaluation of the adhesion strength of the adhesive sheet was carried out in the same manner as in Comparative Example 1 except that irradiation with natural light was carried out in a state where the other release sheet was not released, that is, in a state where the adhesive layer was not exposed.

Comparative Example 4

Evaluation of the adhesion strength of the adhesive sheet was carried out in the same manner as in Comparative Example 2 except that irradiation with natural light was carried out in a state where the other release sheet was not released, that is, in a state where the adhesive layer was not exposed.

Comparative Example 5

Evaluation of the adhesion strength of the adhesive sheet was carried out in the same manner as in Comparative Example 3 except that the adhesive sheet was attached to a surface of a concrete piece without performing the primer treatment.

Comparative Example 6

Evaluation of the adhesion strength of the adhesive sheet was carried out in the same manner as in Comparative Example 4 except that the adhesive sheet was attached to a surface of a concrete piece without performing the primer treatment.

Comparative Example 7

Evaluation of the adhesion strength of the adhesive sheet was carried out in the same manner as in Comparative Example 1 except that the adhesive sheet was attached to a surface of a concrete piece without performing the primer treatment.

Comparative Example 8

Evaluation of the adhesion strength of the adhesive sheet was carried out in the same manner as in Comparative Example 2 except that the adhesive sheet was attached to a surface of a concrete piece without performing the primer treatment.

<Evaluation of Adhesive Sheets>

For evaluation of the adhesive force of each obtained adhesive sheet before curing, the sheet was cut into a piece with a size of 25 mm×150 mm to provide a measurement sample. The release sheet on one side of the measurement sample was released, and an aluminum alloy (A6061; sample, 25 mm×150 mm) was attached to the exposed adhesive layer, followed by measurement of the adhesive force (N/25 mm) to the aluminum plate surface under conditions in accordance with JIS Z0237 (tensile rate, 300 mm/minute; peeling distance, 150 mm; peeling angle 180°) using a tensile tester (manufactured by A&D Company, Ltd; model number, RTF-1150H).

<Evaluation of Applicabilities of Adhesive Sheets>

The release sheet on one side of the adhesive sheet was released, and the exposed adhesive layer was attached to a concrete wall by pressing using a hand roller. The other release sheet was then released to expose the adhesive layer to the air. In this state, the adhesive sheet was left to stand for seven days in an environment in which the sheet was irradiated with natural light. During the seven days, there were four fine days and three cloudy days. The ambient temperature during the seven days was 18 to 25° C. After the seven days of standing, evaluation of the applicability was carried out as follows. The sheet was rated as "∘" when there was no lifting of the adhesive sheet from the concrete wall. The sheet was rated as "×" when the adhesiveness was too weak to allow application of the sheet, or when lifting occurred.

<Evaluation of Adhesion Strengths of Adhesive Sheets>

First, a concrete piece was provided, and a primer (an epoxy amine-based primer containing a bisphenol-based epoxy resin as a base resin and a modified aliphatic polyamine as a curing agent; ALPRON W301, manufactured by Nichibei Resin Co., Ltd.) was applied to a surface of the concrete piece such that the amount of the primer applied was 200 g/m² after drying. The applied primer was then dried. The release sheet on one side of the adhesive sheet was released, and curing of the adhesive layer was carried out in the same manner as described above except that the exposed adhesive layer was attached to the primer-treated surface of the concrete piece by pressing using a hand roller. Subsequently, evaluation by a falling-preventing performance test (JHS 424 2004) was carried out for a piece with a size of 40 mm×40 mm prepared by cutting using a concrete cutter.

<Evaluation of Concrete Falling-preventing Performance>

In addition, by a push-out test according to the NEXCO test method 424-2004, evaluation of the concrete falling-preventing performance was carried out. The evaluation criteria were as follows: "∘", not less than 5 kN; "×", less than 5 kN.

<Evaluation of Curability>

First, a mortar piece (prepared with ISO reference sand, manufactured by Yukou Co., Ltd.) was provided, and a primer (an epoxy amine-based primer containing a bisphenol-based epoxy resin as a base resin and a modified aliphatic polyamine as a curing agent; ALPRON W301, manufactured by Nichibei Resin Co., Ltd.) was applied to a surface of the mortar piece such that the amount of the primer applied was 200 g/m² after drying. The applied primer was then dried. Subsequently, the release sheet on one side of the adhesive sheet was released, and the exposed adhesive layer was attached to the primer-treated surface of the concrete piece by pressing using a hand roller. The other release sheet was then released to expose the adhesive layer to the air. In this state, irradiation with an ultraviolet ray having a wavelength within the range of 300 to 370 nm was carried out using a UV illuminator (Eye Grandage ECS-4011GX, manufactured by Eye Graphics Co., Ltd.) such that the cumulative amount of the light was 800 mJ/cm². Thereafter, one drop of ethyl acetate (manufactured by DIC Graphics Corporation) was added to the surface of the adhesive sheet using a dropper, and whether the surface was dissolved or not was observed to see the curability. When the surface was not dissolved, the curability was rated as "◯". When stickiness of the surface was felt by an index finger due to dissolution of the surface, the curability was rated as "x".

The evaluation results were as shown below in Table 1. In Comparative Examples 1 to 3 and 8, evaluation of the adhesion strength and evaluation of the concrete falling-preventing performance could not be carried out since curing of the adhesive layer did not occur.

TABLE 1

| | Type of curing aid | Primer treatment | Exposure of adhesive layer | Adhesion force (N/25 mm) | Applicability | Adhesion strength (N/mm²) | Falling-preventing performance | Curability |
|---|---|---|---|---|---|---|---|---|
| Example 1 | Basic-substance generator | Yes | Yes | 17 | ◯ | 2.0 | ◯ | ◯ |
| Example 2 | Basic-substance generator | Yes | Yes | 0.05 | ◯ | 1.5 | ◯ | ◯ |
| Comparative Example 1 | Acidic-substance generator | Yes | Yes | 17 | ◯ | — | — | X |
| Comparative Example 2 | Photoradical generator | Yes | Yes | 0.5 | ◯ | — | — | X |
| Comparative Example 3 | Acidic-substance generator | Yes | No | 17 | ◯ | — | — | X |
| Comparative Example 4 | Photoradical generator | Yes | No | 0.5 | ◯ | Not evaluated | Not evaluated | ◯ |
| Comparative Example 5 | Acidic-substance generator | No | No | 17 | ◯ | 0.8 | X | ◯ |
| Comparative Example 6 | Photoradical generator | No | No | 0.5 | ◯ | Not evaluated | Not evaluated | ◯ |
| Comparative Example 7 | Acidic-substance generator | No | Yes | 17 | ◯ | Not evaluated | Not evaluated | ◯ |
| Comparative Example 8 | Photoradical generator | No | Yes | 0.5 | ◯ | — | — | X |

DESCRIPTION OF REFERENCE CHARACTERS

1. Adhesive sheet
10. Adhesive layer
20, 20' Release sheet
30 Repair or reinforcing member containing fibers
40 Repair or reinforcing member

The invention claimed is:

1. A method for repairing or reinforcing a structure by using an adhesive sheet comprising an adhesive layer, the method comprising the steps of:
   applying a primer layer to an entire surface of the structure to be repaired or reinforced, the primer layer comprising an epoxy resin and a polyamine-based curing agent;
   providing the adhesive layer having a composition comprising:
      a curable resin whose curing is promoted by irradiation with ionizing radiation to form a cured resin; and
      a curing aid which is a base-generating compound that generates a basic compound by irradiation with ionizing radiation;
   attaching the adhesive sheet to the primer layer; and
   curing the adhesive layer in a state where the adhesive layer is exposed.

2. The method according to claim 1, wherein
   the adhesive sheet before being attached to the primer layer has a release sheet provided on at least one side of the adhesive layer;
   the method further comprises the step of releasing the release sheet from the adhesive sheet after attaching the adhesive sheet to the primer layer; and
   the adhesive layer is cured after releasing the release sheet from the adhesive sheet.

3. The method according to claim 1, wherein the curable resin comprises a curable compound having at least two epoxy groups in the molecule.

4. The method according to claim 1, further comprising the step of further attaching a repair member or a reinforcing member onto the adhesive layer before the curing of the adhesive layer.

5. The method according to claim 1, wherein the adhesive layer comprises a repair member, a reinforcing member or the repair member or the reinforcing member comprising a fiber material.

6. The method according to claim 1, wherein the curing time of the adhesive layer is at least one day.

7. The method according to claim 1, wherein the curing of the adhesive layer is carried out by irradiation with sunlight.

8. The method according to claim 1, wherein the basic compound is an amine.

9. The method according to claim 1, wherein the curing aid is a base-generating compound represented by the following formula (I):

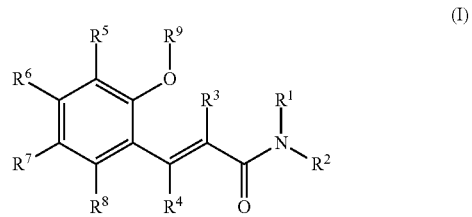

wherein:
   $R^1$ and $R^2$ each independently represent hydrogen, or a linear or branched hydrocarbon group optionally containing a substituent and/or optionally containing an unsaturated bond, with the proviso that at least one of $R^1$ and $R^2$ is the hydrocarbon group, wherein $R^1$ and $R^2$ optionally bind to each other to form a cyclic structure;

$R^3$ and $R^4$ each independently represent hydrogen or a monovalent substituent;

$R^5$ to $R^8$ each independently represent hydrogen or a monovalent substituent, wherein two or more of $R^5$ to $R^8$ optionally bind to each other to form a cyclic structure(s); and $R^9$ represents a protecting group whose deprotection is possible by heating or irradiation with ionizing radiation.

10. The method according to claim 1, wherein the curing aid is a base-generating compound represented by the following formula (II):

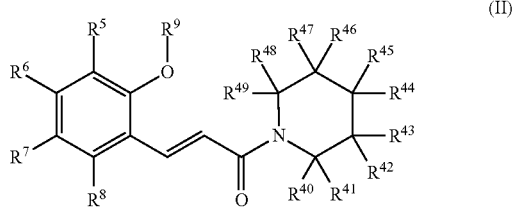

wherein:

$R^5$ to $R^8$ each independently represent hydrogen or a monovalent substituent, wherein two or more of $R^5$ to $R^8$ optionally bind to each other to form a cyclic structure(s);

$R^9$ represents a protecting group whose deprotection is possible by heating or irradiation with ionizing radiation; and $R^{40}$ to $R^{49}$ each independently represent hydrogen or a substituent.

11. The method according to claim 1, wherein the structure is a concrete structure.

12. A method for producing a structure repaired or reinforced by using an adhesive sheet comprising an adhesive layer, the method comprising the steps of:

applying a primer layer to an entire surface of the structure to be repaired or reinforced, the primer layer comprising an epoxy resin and a polyamine-based curing agent;

providing the adhesive layer having a composition comprising:

a curable resin whose curing is promoted by irradiation with ionizing radiation to form a cured resin; and a curing aid which is a base-generating compound that generates a basic compound by irradiation with ionizing radiation;

attaching the adhesive sheet to the primer layer; and curing the adhesive layer in a state where the adhesive layer is exposed.

13. The method according to claim 12, wherein the basic compound is an amine.

14. The method according to claim 12, wherein the structure is a concrete structure.

* * * * *